United States Patent
Bae et al.

(10) Patent No.: US 8,731,114 B2
(45) Date of Patent: May 20, 2014

(54) LLR COMBINING METHOD AND APPARATUS FOR HARQ IN WIRELESS COMMUNICATION SYSTEM

(75) Inventors: Seul Ki Bae, Seoul (KR); Joo Hyun Lee, Suwon-si (KR); Sung Hwan Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1017 days.

(21) Appl. No.: 12/700,589

(22) Filed: Feb. 4, 2010

(65) Prior Publication Data

US 2010/0202572 A1    Aug. 12, 2010

(30) Foreign Application Priority Data

Feb. 6, 2009 (KR) .................. 10-2009-0009670

(51) Int. Cl.
*H04L 27/06* (2006.01)
(52) U.S. Cl.
USPC ...... 375/341; 375/262; 375/E1.028; 714/794; 714/795

(58) Field of Classification Search
None
See application file for complete search history.

(56) References Cited

U.S. PATENT DOCUMENTS

| | | | |
|---|---|---|---|
| 2007/0260959 A1* | 11/2007 | Sidi et al. ................. | 714/755 |
| 2007/0268988 A1* | 11/2007 | Hedayat et al. .......... | 375/347 |
| 2009/0135965 A1* | 5/2009 | Shen et al. ............... | 375/341 |

* cited by examiner

*Primary Examiner* — Adolf Dsouza
(74) *Attorney, Agent, or Firm* — Jefferson IP Law, LLP

(57) ABSTRACT

A Log-Likelihood Ratio (LLR) combining method and apparatus for Hybrid Automatic Repeat Request (HARQ) in a wireless communication system for reducing a number of the LLR bits of previous packet stored for LLR combining are provided. The LLR combining apparatus includes an LLR combiner for combining a first LLR of a currently received packet and a second LLR of a previously received packet, an LLR buffer for storing the second LLR and a first packet exponent for recovering the second LLR in the same size as the first LLR, and an HARQ controller for determining whether the currently received packet is a retransmission packet or an initial transmission packet, and for controlling the LLR combiner to generate a third LLR by combining the first and second LLRs for the retransmission packet and to bypass the initial transmission packet.

17 Claims, 7 Drawing Sheets

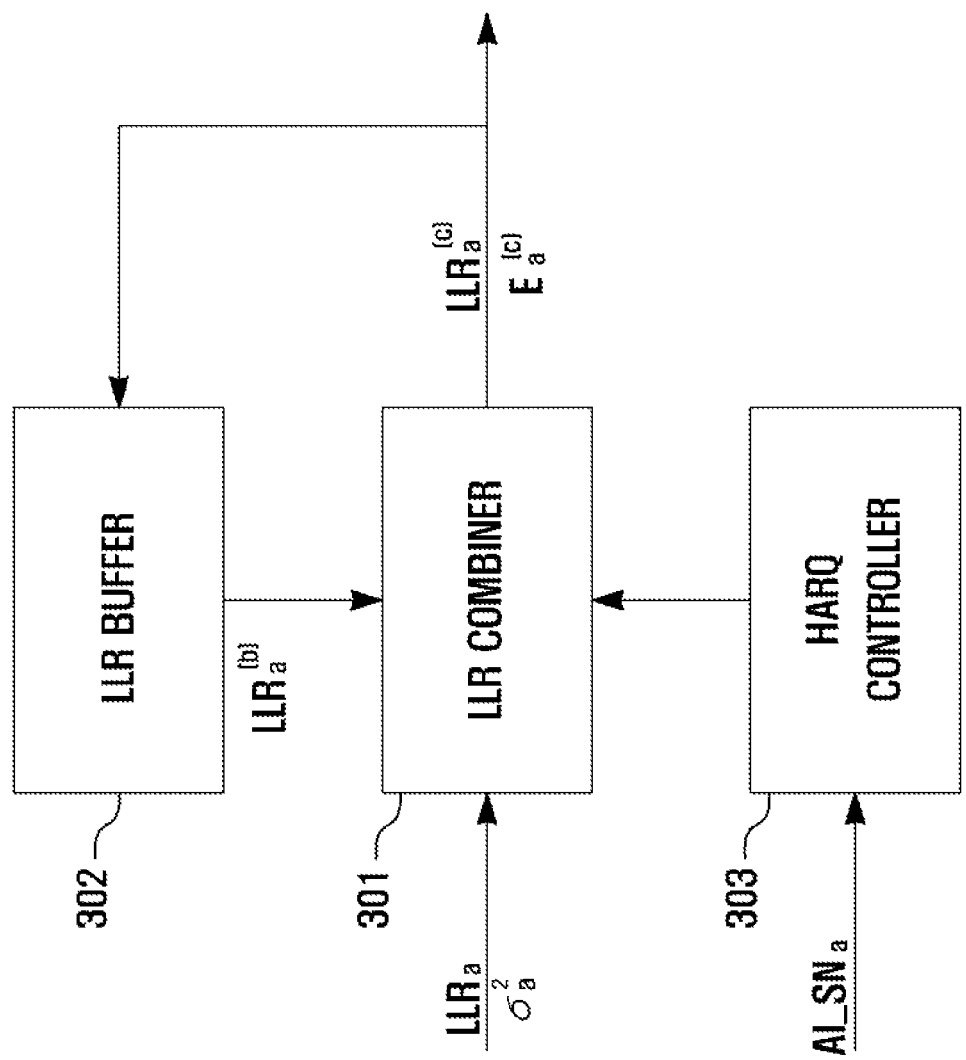

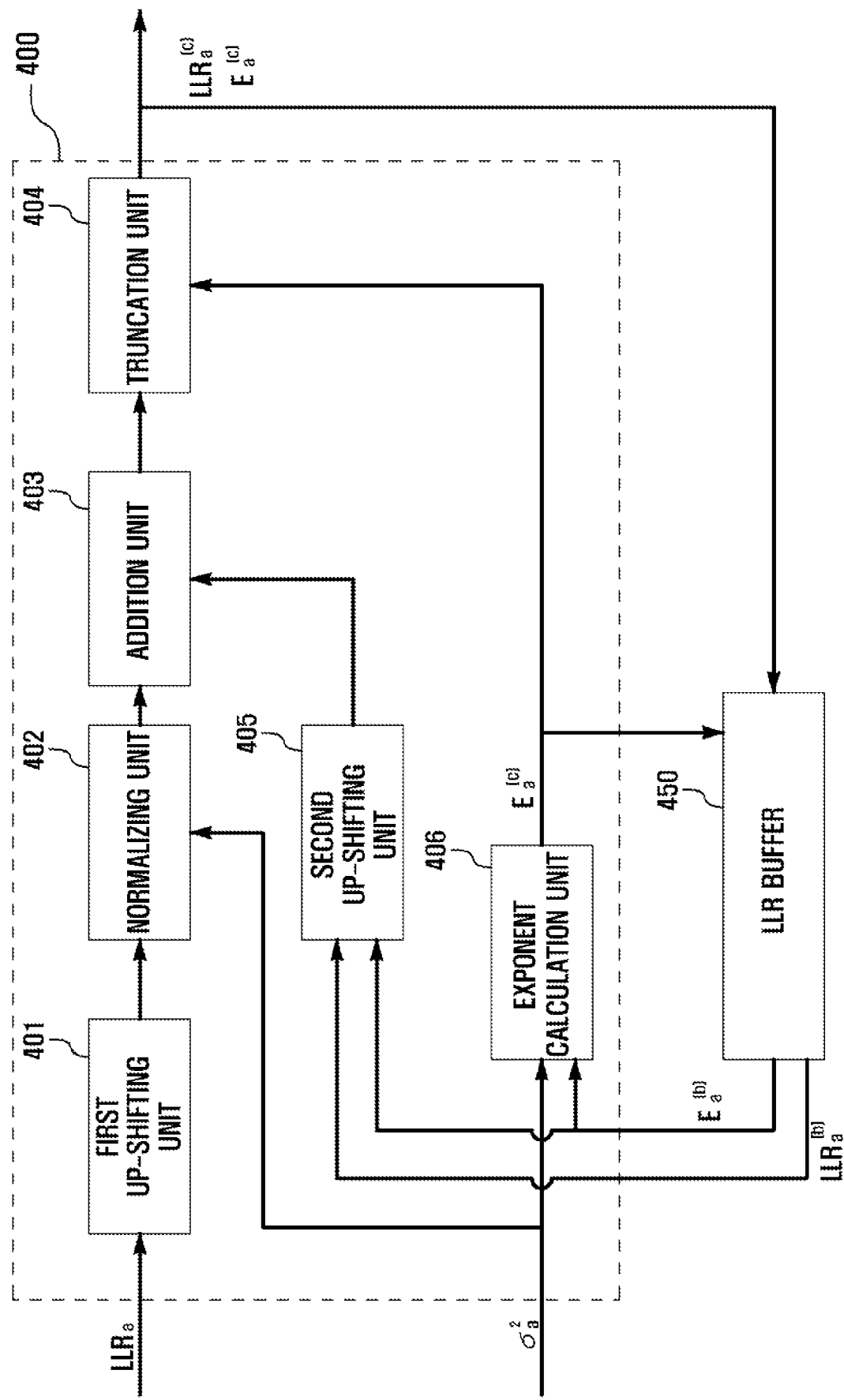

LLR COMBINING METHOD AND APPARATUS FOR HARQ IN WIRELESS COMMUNICATION SYSTEM

PRIORITY

This application claims the benefit under 35 U.S.C. §119(a) of a Korean patent application filed in the Korean Intellectual Property Office on Feb. 6, 2009 and assigned Serial No. 10-2009-0009670, the entire disclosure of which is hereby incorporated by reference.

BACKGROUND OF THE INVENTION

1. Field of the Invention

The present invention relates to wireless communications. More particularly, the present invention relates to a Log-Likelihood Ratio (LLR) combining method and apparatus for Hybrid Automatic Repeat Request (HARQ) in a wireless communication system for reducing a number of LLR bits of a previous packet stored for LLR combining.

2. Description of the Related Art

Next generation communication systems support new technologies to secure high quality and high speed communication. A wireless communication system has a high link error rate and limited resources for error correction as compared to its wire link counterpart. Hybrid Automatic Repeat Request (HARQ) is a technique that improves link performance in a resource-constrained wireless communication environment.

The HARQ technique is an error control technique that combines Automatic Repeat Request as an error control technique on a data link layer and channel coding as another error control technique on a physical layer. The HARQ technique reduces a number of retransmissions, thereby increasing system throughput and transmission efficiency. Typically, the HARQ technique is effective when the channel condition is time-varying and thus a modulation scheme of a transmitter is not adaptive to the channel condition.

Two types of HARQ techniques are Chase Combining and Incremental Redundancy. In Chase Combining, the decoder combines the retransmitted packets with an original packet erroneously transmitted in a previous transmission. In Incremental Redundancy, additional redundant information is transmitted in each retransmission to increase a channel coding gain. When retransmission is requested by the receiver the decoder combines previously stored data with retransmitted data before decoding, thereby improving decoding performance. With the application of the HARQ technique, a number of retransmission requests of the receiver decreases, resulting in improvement of the link efficiency.

Therefore, a need exists for an LLR combining method and apparatus for HARQ in a wireless communication system with improved transmission signal estimation and resource utilization.

SUMMARY OF THE INVENTION

An aspect of the present invention is to address at least the above-mentioned problems and/or disadvantages and to provide at least the advantages described below. Accordingly, an aspect of the present invention is to provide a Log Likelihood Ratio (LLR) combining method and apparatus for Hybrid Automatic Repeat Request (HARQ) that is capable of reducing LLR bits of a previously transmitted packet stored for LLR combining to improve resource utilization efficiency.

In accordance with an aspect of the present invention, an LLR combining method for HARQ is provided. The method includes receiving a first LLR and a first noise variance of a currently received packet, normalizing the first LLR with the first noise variance, verifying a second LLR to be combined with the first LLR, the second LLR being previously stored, and a first packet exponent for recovering the second LLR in the same size as the first LLR, normalizing the second LLR with the first packet exponent, determining a third LLR with the normalized first LLR and second LLR, and estimating a transmission signal using the third LLR.

The determining of the third LLR may include storing the third LLR as the second LLR and the second packet exponent as the first packet exponent.

In accordance with another aspect of the present invention, an LLR combining apparatus for HARQ is provided. The apparatus includes an LLR combiner for combining a first LLR of a currently received packet and a second LLR of a previously received packet, an LLR buffer for storing the second LLR and a first packet exponent for recovering the second LLR in the same size as the first LLR, and an HARQ controller for determining whether the currently received packet is a retransmission packet or an initial transmission packet, and for controlling the LLR combiner to generate a third LLR by combining the first LLR and the second LLR for the retransmission packet and to bypass the initial transmission packet.

The LLR combiner may include an exponent calculator for calculating a second packet exponent corresponding to the third LLR using a first noise variance of the currently received packet and a first exponent stored in the LLR buffer, an up-shifter for shifting up the first LLR as many as a number of bits of the first noise variance and the second LLR as many as a number of bits of the first packet exponent, a normalizer for normalizing the up-shifted first LLR with the first noise variance, an adder for combining the normalized first LLR and the up-shifted second LLR, and a truncator for equalizing a number of bits of the combined first LLR and the second LLR to a number of bits of the first LLR.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which:

FIG. 3 is a block diagram illustrating a configuration of an LLR combining apparatus for HARQ in a wireless communication system according to an exemplary embodiment of the present invention;

FIG. 4 is a block diagram illustrating a configuration of an LLR combiner according to an exemplary embodiment of the present invention.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1A:
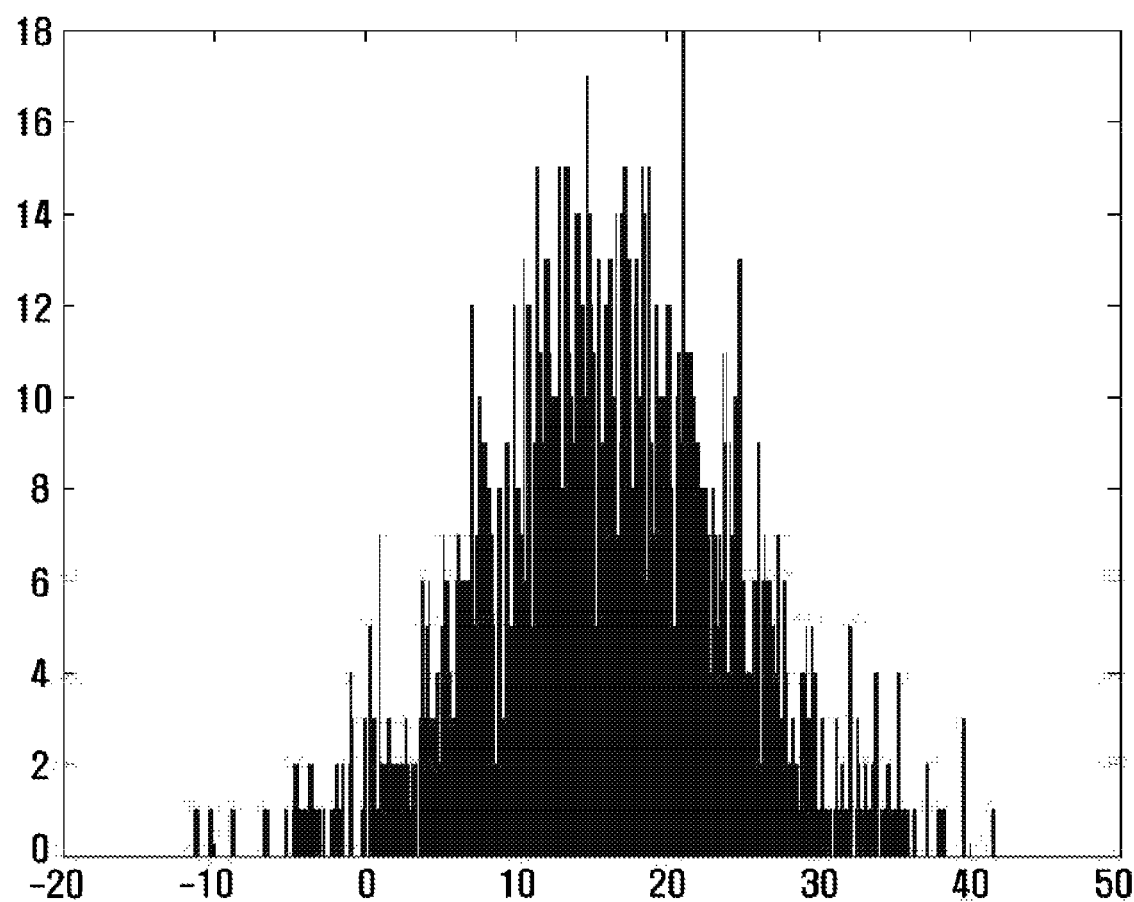
FIGS. 1A and 1B are graphs illustrating Log-Likelihood Ratios (LLRs) distributions of signals received by a receiver in a wireless communication system according to an exemplary embodiment of the present invention.
Figure 1B:
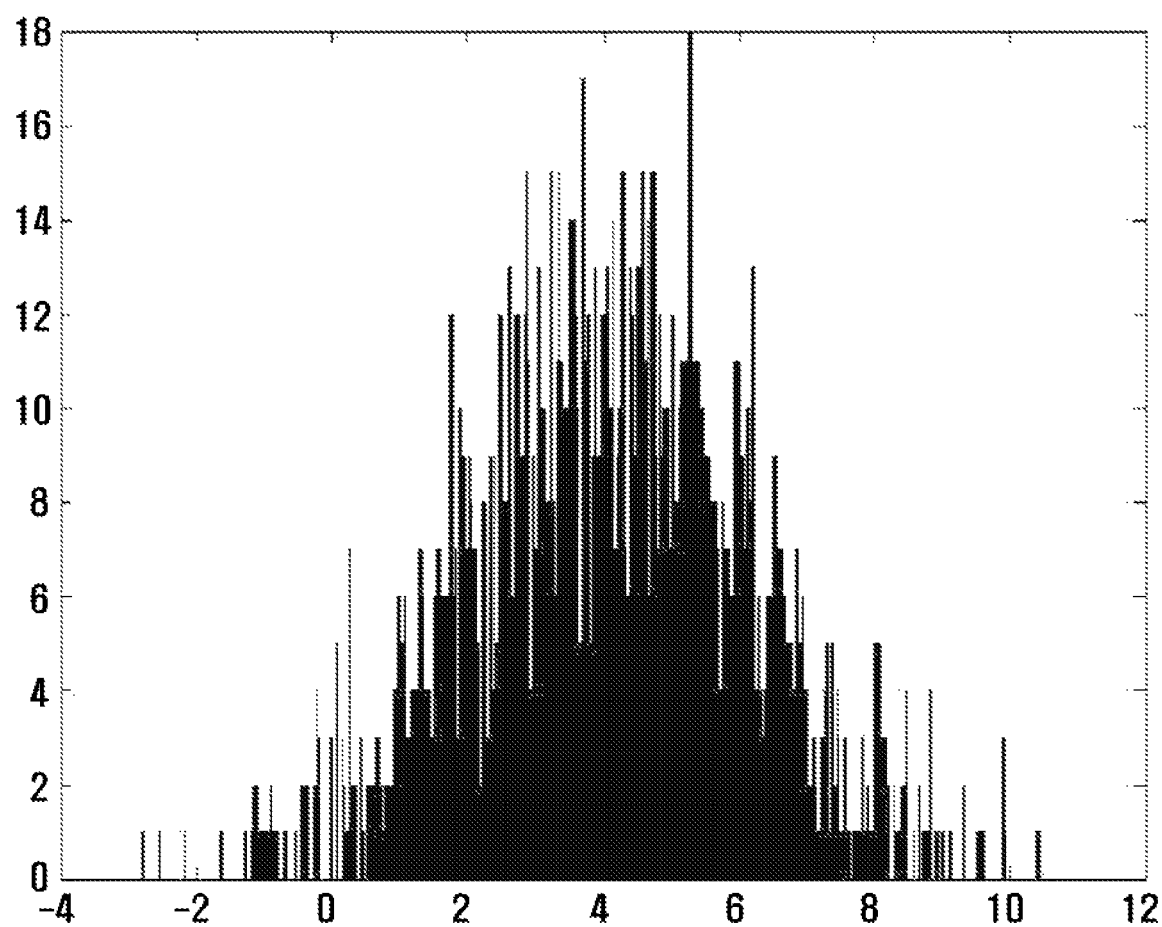

FIGS. 1A and 1B are graphs illustrating Log-Likelihood Ratio (LLR) distributions of signals received by a receiver in a wireless communication system according to an exemplary embodiment of the present invention.

Log-Likelihood Ratio (LLR) is expressed in the form of a noise vector divided by a received vector. In a wireless communication system using Multiple Input Multiple Output (MIMO) based on Minimum Mean Square Error (MMSE), LLR is used as a received vector due to implementation complexity.

The LLR expression may be used in a system that does not adopt Hybrid Automatic Repeat Request (HARQ).

Referring to FIGS. 1A and 1B, the LLR in an Additive White Gaussian Noise (AWGN) channel is defined by equation (1):

$$LLR = \frac{4y}{\sigma^2} \quad (1)$$

wherein $\sigma^2$ is a scaling coefficient, and y is a noise-added received signal.

Also, the LLR to which the scaling coefficient $\sigma^2$ is not reflected is defined by equation (2).

$$LLR' = 4y \quad (2)$$

Assuming that power of a transmission signal is equal to 1, distribution of the LLR computed with the noise-added received signal y and the scaling coefficient $\sigma^2$ is illustrated in FIG. 1A. Also, assuming that the power of the transmission signal is equal to 1, the distribution of LLR' computed only with the noise-added received signal y is illustrated in FIG. 1B. As illustrated in FIGS. 1A and 1B, the LLR and LLR' are similar in relative size due to a scaling effect but not in absolute size. For example, distribution ratios of the LLR and LLR' are identical with each other from the point of reference of 0 in FIGS. 1A and 1B. Accordingly, if LLR' is scaled with an appropriate $\sigma^2$, it is possible to derive LLR from LLR'.

In a wireless communication system supporting HARQ however, expressing the LLR only with the received vector may cause problems since the LLRs are combined.

Figure 2A:
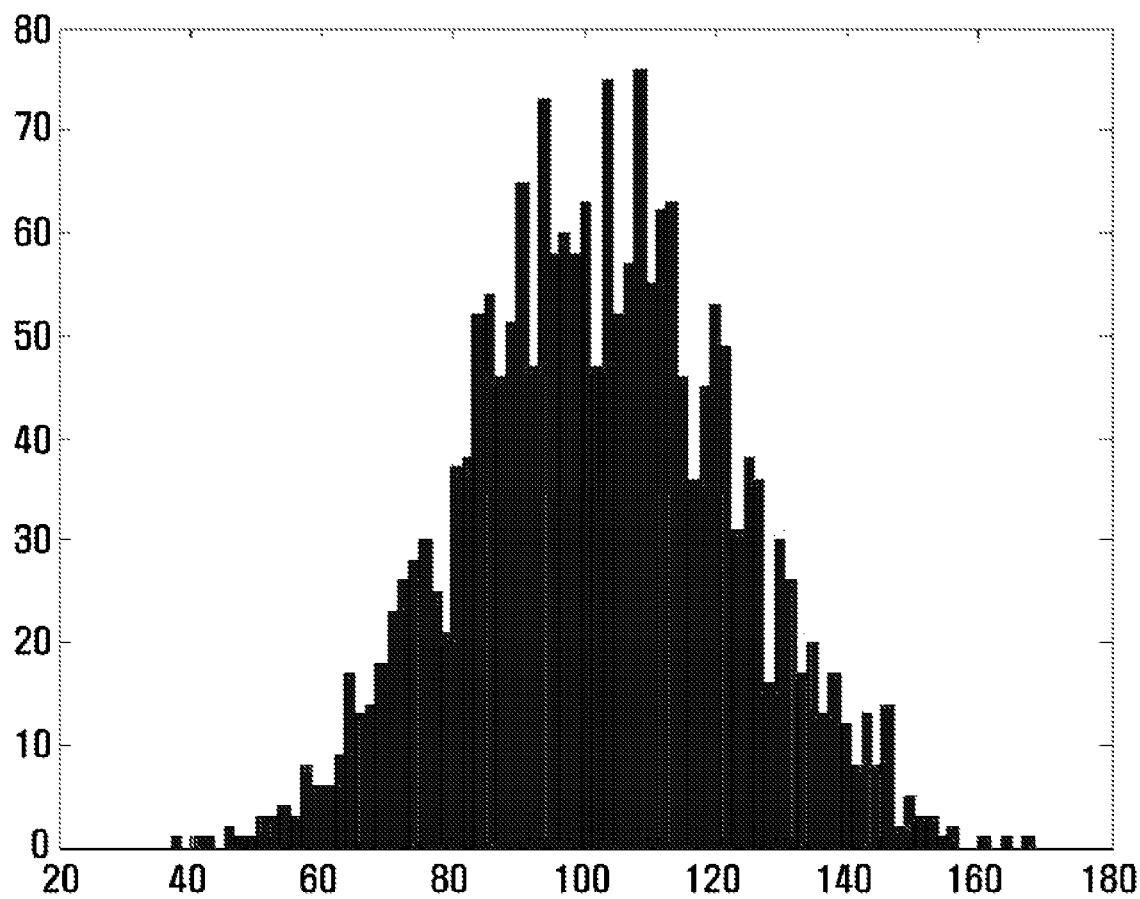
FIGS. 2A and 2B are graphs illustrating distributions of LLRs of received signals that are combined at a receiver in a wireless communication system using Hybrid Automatic Repeat Request (HARQ) according to an exemplary embodiment of the present invention.
Figure 2B:
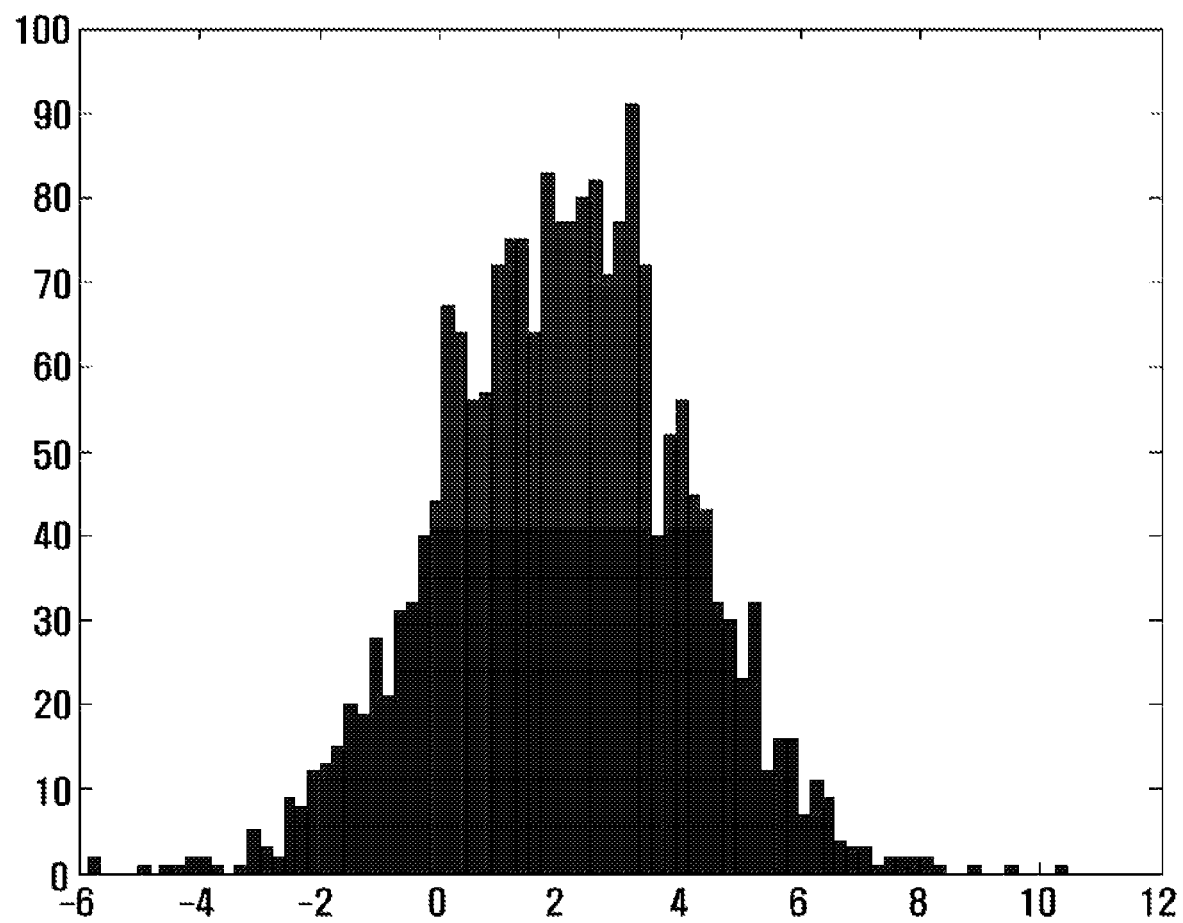

FIGS. 2A and 2B are graphs illustrating distributions of LLRs of received signals that are combined at a receiver in a wireless communication system using HARQ according to an exemplary embodiment of the present invention.

Referring to FIG. 2A, distribution of $LLR_{combine}$ combined using noise-added received signals $y_1$ and $y_2$ and the scaling coefficient $\sigma^2$ as shown in equation (3) when the power of transmission signal is equal to 1 is illustrated.

$$LLR_{combine} = \frac{4y_1}{\sigma_1^2} + \frac{4y_2}{\sigma_2^2} \quad (3)$$

Referring to FIG. 2B, distribution of $LLR'_{combine}$ combined using the noise-added received signals $y_1$ and $y_2$ as shown in equation (4) when power of a transmission signal is equal to 1 is illustrated.

$$LLR'_{combine} = 4y'_1 + 4y'_2 \quad (4)$$

Comparing FIGS. 2A and 2B, it is shown that distribution of the combined LLR is changed regardless of whether the scaling coefficient is used. Accordingly, even though the $LLR'_{combine}$ is scaled with the scaling coefficient $\sigma^2$, it is impossible to recover the original $LLR_{combine}$.

A problem exists in that a ratio of the $LLR'_{combine}$ value and the $LLR'_{combine}$ value distributed from the point of reference of 0 is changed. The transmission signal may be estimated correctly when the distribution ratio of the $LLR'_{combine}$ value and the $LLR_{combine}$ value from the point of reference of 0. If an incorrect HARQ scheme is used, the ratio between the $LLR'_{combine}$ value and the $LLR_{combine}$ value increases abruptly, resulting in a significant error.

In an exemplary implementation, an LLR combining method and apparatus for supporting HARQ in the wireless communication is proposed.

FIG. 3 is a block diagram illustrating a configuration of an LLR combining apparatus for HARQ in a wireless communication system according to an exemplary embodiment of the present invention.

Referring to FIG. 3, the LLR combining apparatus includes an LLR combiner 301, an LLR buffer 302 and a HARQ controller 303.

An $LLR_a$ and noise coefficient $\sigma_a^2$ of a currently received packet are input to the LLR combiner 301. The $LLR_a$ has not been normalized with a noise variance due to a restriction of bit-precision. Accordingly, in order to perform the LLR combining accurately, the $LLR_a$ must be normalized with the noise variance.

The LLR combiner 301 reads the LLR of a previous packet ($LLR_a^{(b)}$) from the LLR buffer 302 and combines the $LLR_a^{(b)}$ with a current LLR ($LLR_a$). In more detail, since the LLR of the previous packet has already been normalized with the noise variance, the LLR combiner 301 may combine the LLR as shown in equation (5):

$$LLR_a^{(c)} = \frac{LLR_a}{\sigma_1^2} + \frac{LLR_a^{(b)}}{\sigma_2^{(b)2}} \qquad (5)$$

The LLR buffer 302 stores the LLR of the previous packet, i.e., $LLR_a^{(b)}$, and packet exponent $E_a^{(b)}$ for recovering the previous packet in identical size.

The HARQ controller 303 determines whether to combine the $LLR_a$ of the current input packet with the $LLR_a^{(b)}$ of the previous packet. For this purpose, the HARQ controller 303 verifies an ARQ Identifier Sequence Number$_a$ (AI_SN$_a$) of an H-ARQ Channel Identifier (ACID) of the current input packet.

If the AI_SN$_a$ is equal to 1, this means that the received packet is not a retransmitted packet but an initially transmitted packet. Accordingly, the HARQ controller 303 controls the LLR combiner 301 to normalize the current input $LLR_a$ with the noise variance and outputs the normalized LLR value for transmission signal estimation. That is, the LLR combining process is skipped for an initial transmission, and the current input $LLR_a$ is normalized and then output. At this time, the current input $LLR_a$ is stored as $LLR_a^{(b)}$ in the LLR buffer 302 for next LLR combining. Here, the noise variance $\sigma_a^2$ is stored as a packet exponent for recovering the $LLR_a^{(b)}$ in the same size as the normalized LLR value for LLR combining.

If the AI_SN$_a$ is equal to 0, this means that the $LLR_a$ input to the LLR combiner 301 is the LLR of a retransmitted packet. Accordingly, the HARQ controller 303 controls the LLR combiner 301 to combine the value obtained by normalizing the $LLR_a$ of the current input packet with the noise variance $\sigma_a^2$ and the $LLR_a^{(b)}$ of the previous packet to output $LLR_a^{(c)}$.

The combined LLR (i.e., $LLR_a^{(c)}$) is stored in the LLR buffer 302 and used as $LLR_a^{(b)}$ for the next retransmission packet. Also, the $LLR_a^{(c)}$ is input to a decoder (not illustrated) for transmission signal estimation.

FIG. 4 is a block diagram illustrating a configuration of an LLR combiner according to an exemplary embodiment of the present invention.

In an exemplary implementation, it is assumed herein that the LLR of a packet is composed of 12-bits, and $\sigma^2$ is composed of 24-bits. The LLR of a currently received packet is expressed as $LLR_a$ (i.e., first LLR), and a noise variance of the currently received packet is expressed as $\sigma_a^2$ (i.e., first noise variance). Also, the LLR of a previously received packet is expressed as $LLR_a^{(b)}$ (i.e., second LLR), and the packet exponent for recovering the second LLR in the same size as the first LLR normalized is expressed as $E_a^{(b)}$ (i.e., a first packet exponent). The packet exponent for outputting the combined value of the first LLR and the second LLR in the same size as the first LLR is expressed as $E_a^{(a)}$ (i.e., a second packet exponent), and the final LLR obtained by adopting the second packet exponent to the combined value of the first LLR and the second LLR is expressed as $LLR_a^{(c)}$ (i.e., third LLR).

Referring to FIG. 4, the LLR combiner 400 of the LLR combining apparatus for the HARQ includes a first up-shifting unit 401, a normalizing unit 402, an addition unit 403, a truncation unit 404, a second up-shifting unit 405 and an exponent calculation unit 406.

The exponent calculation unit 406 determines $E_a^{(a)}$ corresponding to the combined $LLR_a^{(c)}$ using noise variance $\sigma_a^2$ of the received packet and $E_a^{(b)}$ corresponding to the $LLR_a^{(b)}$ of a previous packet stored in an LLR buffer 450. Here, it is assumed that the noise variance $\sigma_a^2$ is composed of 24-bits, and $E_a^{(b)}$ is input from an LLR buffer 450 and composed of 6-bits.

In this case, the exponent calculation unit 406 determines a new exponent $E_a^{(c)}$ as shown in equation (6). Although it is assumed herein that the number of bits of $\sigma_a^2$ is equal to 24 in equation (6), the number of bits is not limited thereto. For example, the noise variance $\sigma_a^2$ may be selected from N natural values.

$$E_a^{(c)} = \begin{cases} \min(E_a^{(b)}, 24-x) & \text{if } 2^x \le \sigma^2 < 2^{x+1}, \; x = 0, 1, \ldots, 23 \\ \min(E_a^{(b)}, 24) & \text{if } \sigma^2 = 0 \end{cases} \qquad (6)$$

If the currently received packet is an initial transmission packet, $LLR_a^{(b)}$ is set to 0 and $E_a^{(b)}$ is set to 24.

The first up-shifting unit 401 shifts up the $LLR_a$ as many as the number of bits of the noise variance to balance the number of bits of the $LLR_a$ with the number of bits of the noise variance $\sigma_a^2$. In an exemplary implementation, the $LLR_a$ is 12-bits long and the noise variance is 24-bits long. Accordingly, the first up-shifting unit 401 shifts up the $LLR_a$ as many as 24-bits to generate an $LLR_a$ of 36-bits.

The normalizing unit 402 divides the $LLR_a$ up-shifted by the first up-shifting unit 401 by the noise variance $\sigma_a^2$. Since the division operation is impossible with the $\sigma_a^2$ set to 0, the normalizing unit 402 performs the division operation with the $\sigma_a^2$ set to 1.

The second up-shifting unit 405 shifts up the $LLR_a^{(b)}$ of 12-bits stored in the LLR buffer 450 as many as the number of bits of the $E_a^{(b)}$ stored in the LLR buffer 450. For instance, since the $E_a^{(b)}$ is initialized to 24-bits for an initial transmission, the $LLR_a^{(b)}$ output by the second up-shifting unit 405 is 36-bits long.

The addition unit 403 performs an adding operation with the $LLR_a$ and $LLR_a^{(b)}$, and the truncation unit 404 saturates the starting part of the 36-bits result output by the addition unit 403 as much as $25-E_a^{(c)}$ and truncates an ending part of a 35-bit result as much as $E_a^{(b)}$ to output $LLR_a^{(c)}$ of 12 bits. The output value of the truncation unit 404 is stored in the LLR buffer and provided to a decoding unit (not illustrated) for transmission signal estimation.

Figure 5:
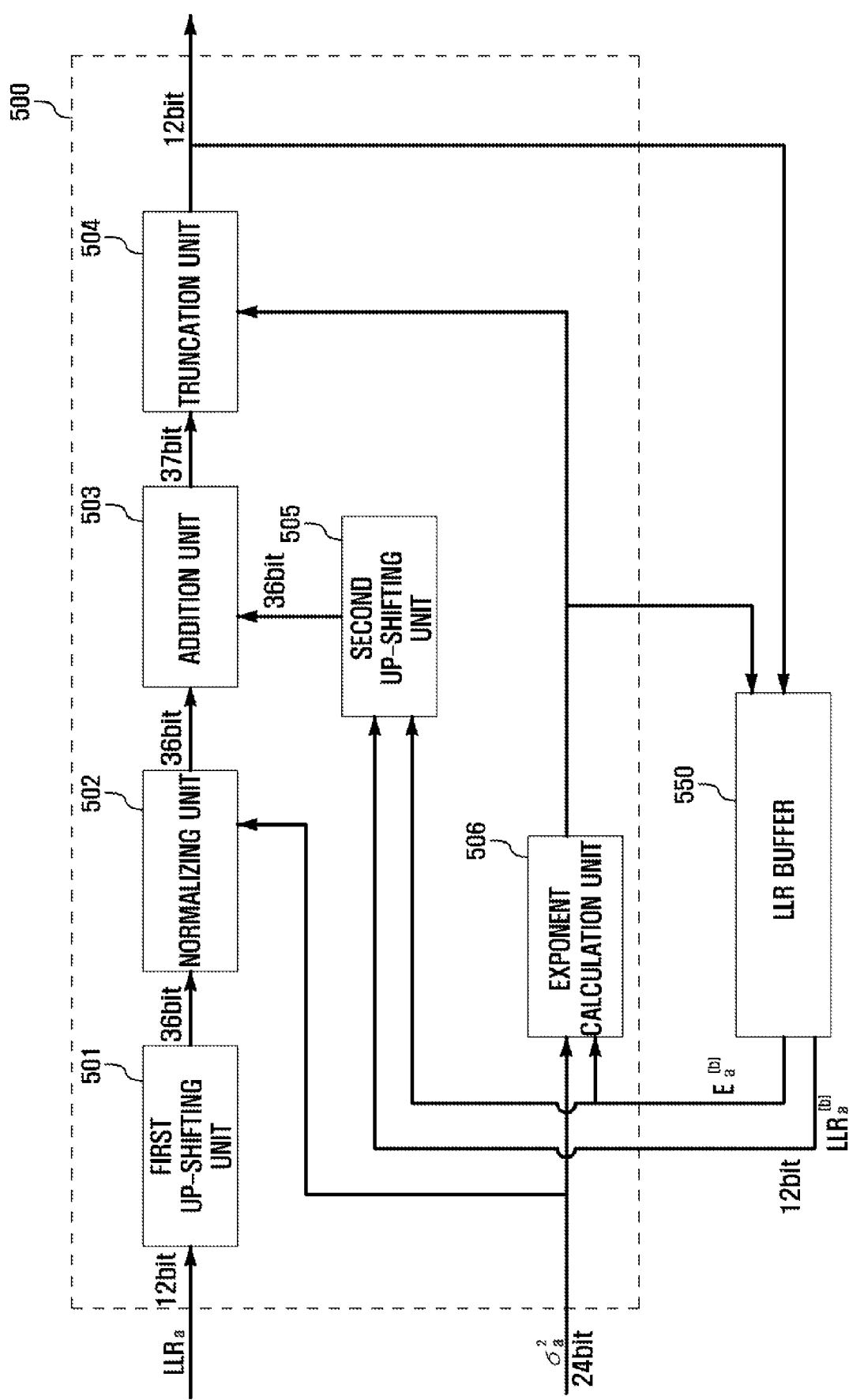
FIG. 5 is a block diagram illustrating a configuration of an LLR combiner according to an exemplary embodiment of the present invention.

FIG. 5 is a block diagram illustrating a configuration of an LLR combiner according to an exemplary embodiment of the present invention.

Referring to FIG. 5, the LLR combiner 500 includes a first up-shifting unit 501, a normalizing unit 502; an addition unit 503, a truncation unit 504, a second up-shifting unit 505, an exponent calculation unit 506 and an LLR buffer 550. In FIG. 5, the number of bits at an output port of each functional block is a maximum number of bits. For convenience, a signal value is expressed in binary.

In FIG. 5, it is assumed herein that the value of $LLR_a$ of an initial transmission packet is 111111 and the value of $\sigma_a^2$ is 11. The $LLR_a$ value of '111111' represents valid bits among 12-bits '000000111111', and the $\sigma_a^2$ value of '11' represents the valid bits among 24-bits. Unless otherwise noted, a valid value is expressed in binary.

The first up-shifting unit 501 shifts up the $LLR_a$ value of '111111' as many as 24-bits to output '111111000000000000000000000000'. Also, the normalizing unit 502 divides the up-shifted $LLR_a$ by '11' of $\sigma_a^2$ to output the value of '101010000000000000000000000000' to the addition unit 503. As aforementioned, it has been determined that a currently received packet is an initial transmission packet, the $LLR_a^{(b)}$ is set to 0 and the $E_a^{(b)}$ is set to 24. Accordingly, the addition unit 503 adds the $LLR_a$ value of '101010000000000000000000000000' and the $LLR_a^{(b)}$ value of '0' and outputs a result value of '10101000000000000000000000000' to the truncation unit 504. In more detail, since the addition unit 503 may output up to 37-bits, the addition unit 503 outputs the result value of '0000000101010000000000000000000000000' to the truncation unit 504.

The truncation unit 504 determines a truncation range by using equation (7). Here, the description is made under the assumption that $E_a^{(b)}$ is equal to 24 and $\sigma_a^2$ is 11 in binary. Since $\sigma_a^2$ is 3 in decimal, x becomes 1. These values are assigned to equation (7), $E_a^{(c)}$ may be written as follows:

$$E_a^{(b)} = \min(E_a^{(b)} = 24, 24-1) \text{ if } 2^1 \le \sigma_a^2 = 3 \le 2^2 = 23 \quad (7)$$

As aforementioned, the truncation unit 503 may saturate a starting part of the 37-bit result value output by the addition unit 503 as many as $25-E_a^{(c)}$ bits and truncate an ending part of the 37-bit result value as many as $E_a^{(c)}$ bits. Accordingly, the 37-bit result value of '0000000101010000000000000000000000000' output by the addition unit 503 is processed by the truncation unit 504 to be output as a 12-bit value of '000000101010'. The $LLR_a^{(c)}$, i.e., the result value, of '000000101010' is stored in the LLR buffer 450 as $LLR_a^{(b)}$, and the $E_a^{(c)}$ of the value '23' is stored as $E_a^{(b)}$.

Hereinafter, a description is made under the assumption that $LLR_a$ is 100001 and $\sigma_a^2$ is 1011. The first up-shifting unit 501 shifts up the value of $LLR_a$ '100001' to output '10000100000000000000000000000'. The normalizing unit 502 divides the up-shifted $LLR_a$ by $\sigma_a^2$ to output the value '110000000000000000000000000' to the addition unit 503.

In order for the addition unit 503 to perform an addition operation, the $LLR_a^{(b)}$ value of '000000101010' stored in the LLR buffer 450 is input to the second up-shifting unit 505 along with the $E_a^{(b)}$ value of '23'.

The second up-shifting unit 505 shifts up the $LLR_a^{(b)}$ as many as the number of bits of $E_a^{(b)}$ to recover the original signal of '00000010101000000000000000000000000'. The addition unit 503 performs the addition operation on the $LLR_a$ and $LLR_a^{(b)}$ to output the value of '110000000000000000000000000'. In more detail, 37-bits of '0000000110000000000000000000000000000' are output as the addition result.

Since $E_a^{(b)}$ is equal to 23 and $\sigma_a^2$ is 1101 in binary and 13 in decimal, the $E_a^{(c)}$ is determined by equation (8):

$$E_a^{(c)} = \min(E_a^{(b)} = 23, 24-3) \text{ if } 3^3 \le \sigma_a^2 = 13 \le 2^4 = 21 \quad (8)$$

The 37-bit value of '0000000011000000000000000000000000000' output by the addition unit 503 is saturated at a starting part as many as the number of bits of $25-E_a^{(c)}=4$ to be '000011000000000000000000000000000'. Also, the saturation result value of '000011000000000000000000000000000' is truncated at an ending part as many as $E_a^{(c)}=21$ to be output as a 12-bit value of '000011000000'.

As described above, the LLR combining method and apparatus for HARQ in a wireless communication system according to exemplary embodiments of the present invention is capable of combining LLRs accurately, resulting in improved transmission signal estimation reliability.

While the invention has been shown and described with reference to certain exemplary embodiments thereof, it will be understood by those skilled in the art that various changes in form and details may be made therein without departing from the spirit and scope of the invention, as defined by the appended claims and their equivalents.

What is claimed is:

1. A Log-Likelihood Ratio (LLR) combining method for Hybrid Automatic Repeat Request (HARQ), the method comprising:
   receiving a first LLR and a first noise variance of a currently received packet;
   normalizing the first LLR with the first noise variance;
   verifying a second LLR to be combined with the first LLR, wherein the second LLR is determined based on a previously received packet;
   verifying a first packet exponent for recovering the second LLR in the same size as the first LLR, wherein the first packet exponent is determined based on the previously received packet;
   determining a third LLR based on the normalized first LLR, the second LLR and the first packet exponent; and
   estimating a transmission signal using the third LLR.

2. The LLR combining method of claim 1, wherein the determining of the third LLR comprises:
   determining a second packet exponent corresponding to the third LLR using the first noise variance and the first packet exponent; and
   determining the third LLR using a combined value of the normalized first LLR, the second LLR and the second packet exponent.

3. The LLR combining method of claim 1, wherein the second LLR is equal to 0 when the currently received packet is an initial transmission packet.

4. The LLR combining method of claim 2, wherein the determining of the third LLR comprises equalizing a number of bits of the combined value of the first LLR and the second LLR to a number of bits of the first LLR.

5. The LLR combining method of claim 2, wherein the determining of the third LLR comprises storing the third LLR as the second LLR and the second packet exponent as the first packet exponent.

6. A Log-Likelihood Ratio (LLR) combining apparatus for Hybrid Automatic Repeat Request (HARQ), the apparatus comprising:
   an LLR combiner for combining a first LLR of a currently received packet and a second LLR of a previously received packet;
   an LLR buffer for storing the second LLR determined based on a previously received packet and a first packet exponent for recovering the second LLR in the same size as the first LLR, wherein the first packet exponent is determined based on the previously received packet; and
   an HARQ controller for determining whether the currently received packet is at least one of a retransmission packet and an initial transmission packet, and for controlling the LLR combiner to generate a third LLR based on the first LLR, the second LLR and the first packet exponent for the retransmission packet and to bypass the initial transmission packet.

7. The apparatus of claim 6, wherein the second LLR is equal to 0 when the currently received packet is the initial transmission packet.

8. The apparatus of claim 6, wherein the third LLR is generated using a combined value of the first LLR, the second LLR and a second packet exponent.

9. The apparatus of claim 6, wherein the third LLR is generated by equalizing a number of bits of the combined value of the first LLR and the second LLR to a number of bits of the first LLR.

10. The apparatus of claim 6, wherein the LLR combiner comprises an exponent calculator for determining a second packet exponent corresponding to the third LLR using a first noise variance of the currently received packet and a first exponent stored in the LLR buffer.

11. The apparatus of claim 10, wherein the third LLR is stored as the second LLR and the second packet exponent is stored as the first packet exponent.

12. The apparatus of claim 10, wherein the LLR combiner comprises an up-shifter for shifting up the first LLR as many as a number of bits of the first noise variance.

13. The apparatus of claim 12, wherein the LLR combiner comprises a second up-shifter for shifting up the second LLR as many as a number of bits of the first packet exponent.

14. The apparatus of claim 13, wherein the LLR combiner comprises a normalizer for dividing the up-shifted first LLR by the first noise variance.

15. The apparatus of claim 14, wherein the LLR combiner comprises an adder for combining the divided up-shifted first LLR and the up-shifted second LLR.

16. The apparatus of claim 15, wherein the LLR combiner comprises a truncator for equalizing a number of bits of the combined first LLR and second LLR to a number of bits of the first LLR.

17. The apparatus of claim 16, wherein the equalized number of bits is provided to a decoding unit for transmission signal estimation.

\* \* \* \* \*